No. 711,626. Patented Oct. 21, 1902.
J. S. HEATH & E. BASEMAN.
FURROW OPENER FOR SEEDING MACHINES.
(Application filed June 5, 1902.)

(No Model.)

Witnesses,
C. W. Benjamin
M. W. Clephane

Inventors,
James Samuel Heath
and
Ernest Baseman.
by Robert Mitchell Rogers
atty

UNITED STATES PATENT OFFICE.

JAMES SAMUEL HEATH AND ERNEST BASEMAN, OF MACEDON, NEW YORK, ASSIGNORS TO BICKFORD & HUFFMAN COMPANY, OF MACEDON, NEW YORK, A CORPORATION OF NEW YORK.

FURROW-OPENER FOR SEEDING-MACHINES.

SPECIFICATION forming part of Letters Patent No. 711,626, dated October 21, 1902.

Application filed June 5, 1902. Serial No. 110,260. (No model.)

*To all whom it may concern:*

Be it known that we, JAMES SAMUEL HEATH, a British subject, and ERNEST BASEMAN, a citizen of the United States, both residing at Macedon, in the county of Wayne and State of New York, have invented certain new and useful Improvements in Furrow-Openers for Seeding-Machines, of which the following is a specification.

Our invention relates to seeding-machines or grain-drills, and more particularly to that class of seeding-machines provided with rotating disks or colters which in the operation of the machine cut or open furrows wherein the grain or seed is deposited. These seeding-machines are known in the art as "disk drills" and are ordinarily constructed with disks journaled to rotate at an angle relative to the line of motion on which they are made to travel when passing through the soil, and as a consequence the furrows formed thereby approximate more or less closely to a V shape—that is to say, the furrow is broader at the top than at the bottom. The conduit through which the grain or seed is deposited in the furrow is ordinarily arranged at the rear of the disk and in such manner that its lower extremity is contained entirely within the furrow and has no effect in enlarging it. When this form of disk drill is employed, it often happens, due to the inclined sides of the V-shaped furrows, that the grain or seed deposited at the apex thereof has insufficient space for proper germination and that the plant is liable to be root-bound and stunted in its growth.

It is the object of our invention to obviate this difficulty and to form a furrow with a flat and wider seed-bed. To this end we propose to construct and arrange a conduit in such manner that it will not be entirely contained within the furrow formed by the disk, but will extend to one side thereof, so as to coöperate with the disk in the cutting of the furrow and to form it with a broader bed.

Our invention consists in the construction and combination of parts now to be described in the specification and finally pointed out in the claims.

Figure 3:
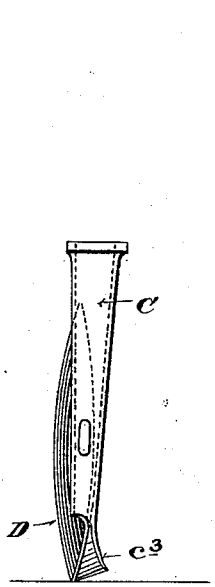
Figure 1:
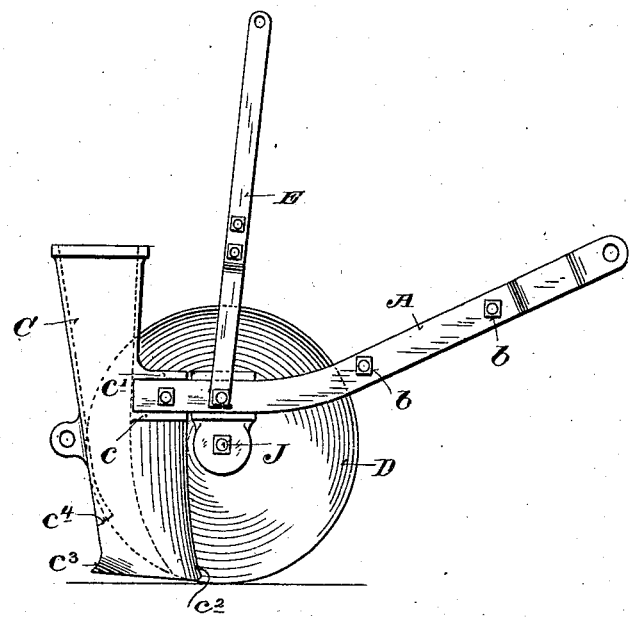
Figure 2:
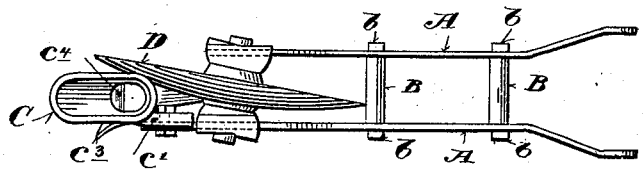

Referring to the drawings, wherein the same parts are designated by the same letters of reference throughout, Figure 1 is a view of a single disk and conduit and shows also the side bar and a connection for raising and lowering the disk and conduit. Fig. 2 shows in plan view the arrangement of the disk with reference to the side bar and the location of the conduit in relation thereto. Fig. 3 is a detail showing in rear elevation the relation the conduit to the disk.

It will of course be understood that our invention may be applied to any suitable form of grain-drill mechanism and that any desired number of disks and conduits may be connected thereto. For the purposes of illustration we have shown only a single set of the connected parts.

The side or drag bars A A may be of any suitable or desired construction, but are shown in the drawings in duplicate, having tubular spreaders B B, located between them and being fastened together by bolts $b\,b$, which pass from one bar to another through the spreaders B B. Suitably journaled at J near the rear of the side bars is a disk D, which is shown in the drawings as concavo-convex or saucer-shaped. Any suitable means of journaling the disk D may be employed, and further description thereof will be unnecessary, as this feature forms no part of our invention. For the purposes of illustration we have shown the disk D as journaled in the side bars at an angle to the line of draft and in such manner that the lower edge of the disk will enter the soil and cut into it by reason of the engagement of its concave side therewith.

The grain conduit or tube C is attached to one of the side bars A A behind the journal J of the disk D in any suitable manner, it being shown in the drawings as provided with two parallel ribs $c\,c'$, between which is inserted the end of the bar A, which is then bolted or otherwise removably connected to the conduit. The front edge of the conduit below the ribs $c\ c'$ is inclined inwardly and made to conform in shape to the convex side of the disk D in the manner well understood and extends downwardly to a point $c^2$ nearly on a level with the lower or cutting edge of the disk D. From the point $c^2$ the lower or cutting edge of the conduit extends horizontally to the rear and is flared outwardly away from the disk to a point $c^3$ in a manner similar to the moldboard of a plow, as clearly shown in the drawings, in such manner that it projects considerably beyond the cutting-line of the disk and therefore beyond the furrow which would be formed by the disk D if employed alone. The result of this formation is that during the forward movement of the disk D a furrow will be opened in the soil by the entrance into it of the concave edge of the disk, which will penetrate and lift the soil on the one side, and that at practically the same instant the soil on the convex side of the disk D will be engaged by the horizontal cutting edge of the conduit C at or near the points $c^2$, and as the conduit C moves forward the soil will be penetrated and lifted by its lower flaring edge or moldboard in substantially the same manner that it is penetrated and raised by the concave edge at the other side of the disk, and a furrow will thus be formed having a broader and flatter seed-bed than would be secured in the use of the disk alone. While the furrow is being formed in the manner just described the grain or seed may be deposited therein through the conduit C, its inner formation being clearly shown in Fig. 2 and also by dotted lines in the other figures, the general slope of which conducts the seed or grain to a point within the furrow opened and maintained by the disk D and conduit C. To still further insure the delivery of the seed or grain within the furrow, we have provided the rear inner surface of the grain-tube near its lower part with a projection $c^4$, (see Figs. 1 and 2,) upon which the grain or seed will strike during its passage through the tube and which prevents it from falling rearwardly and serves to deflect it well within the open furrow. As the disk and conduit move forward in the further operation of the machine the portion of the furrow opened and maintained by the lower edge of the conduit C will pass over the rear point $c^3$ thereof and fall upon the grain already deposited.

The side or drag bars A A may be attached to the machine in any suitable manner. A lifting-strap E is shown in Fig. 1 as connected to the side bars at its lower end and may be attached at its upper end to any suitable mechanism for raising and lowering the disks and conduits. This, however, forms no part of our present invention.

We believe that our construction as above described is well adapted to obviate the objections arising from the V-shaped furrow and that it is adapted to form a broad and flat seed-bed, upon which the seed is scattered and immediately covered by the soil falling back from the curved edge of the conduit, thereby avoiding the congested condition so common to the rows of grain when planted in a V-shaped furrow and affording the best possible conditions for germination and development.

Another advantage arising from our invention is that the horizontal cutting edge of the conduit, which coöperates with the disk in the moving and uplifting of the soil, but in the opposite direction to the action of the disk, has a tendency to counterbalance the side draft incidental to the action of all disks when set at an angle relative to motion, and, more than this, assists to some extent in holding the disk more positively down to its work.

We have herein described a preferred form of reducing our invention to practice; but it will be obvious that many changes and variations may be made therein without departing from the spirit of our invention.

Having thus described our invention, its construction and mode of operation, what we claim, and desire to secure by Letters Patent of the United States, is as follows:

1. In a seeding-machine, the combination of an angularly-inclined rotatable disk and a conduit located in proximity thereto and projecting beyond the cutting-line of the disk, the whole forming a furrow-opener.

2. In a seeding-machine, the combination of an angularly-inclined rotatable disk suitably journaled in the frame with a conduit also suitably connected to the frame in proximity to the disk and projecting beyond the cutting-line of the disk, the lower edge of the conduit being curved to raise the soil, the whole constituting a furrow-opener.

3. In a seeding-machine, the combination of an angularly-inclined rotatable disk and a conduit formed with a furrow-opening device which projects beyond the cutting-line of the disk, the whole constituting a furrow-opener.

4. In a seeding-machine, the combination of an angularly-inclined rotatable disk and a conduit provided with an edge conforming to the shape of the disk and a lower flaring edge which projects beyond the cutting-line of the disk, the whole constituting a furrow-opener.

5. In a seeding-machine, the combination of an angularly-inclined rotatable disk and a conduit which projects beyond the cutting-line of the disk, the whole constituting a furrow-opener, together with a projection in the rear inner surface of the conduit to deflect grain or seed passing therethrough.

6. In a seeding-machine, the combination of an angularly-inclined rotatable disk and a conduit provided with a lower flaring edge which coacts with the disk in the opening of a furrow for the reception of grain or seed from the conduit.

7. In a seeding-machine, the combination of an angularly-inclined rotatable disk and a conduit provided with a forward edge conforming to the shape of the disk, and a lower flaring edge which coacts with the disk in the opening of a furrow for the reception of grain or seed from the conduit.

In testimony whereof we have signed our names to this specification in the presence of two subscribing witnesses.

JAMES SAMUEL HEATH.
ERNEST BASEMAN.

Witnesses:
P. J. NELSON,
F. G. COLLEY.